United States Patent [19]

Guerriero et al.

[11] Patent Number: 4,806,249

[45] Date of Patent: Feb. 21, 1989

[54] PROCESS FOR THE SEPARATION OF INDIUM FROM ANIDIC SOLUTIONS CONTAINING IT

[75] Inventors: Renato Guerriero, Mestre; Letizia Meregalli, Venice; Italo Vittadini, Mestre, all of Italy

[73] Assignee: Samim Societa Azionaria Minero-Metallurgica S.p.A., Rome, Italy

[21] Appl. No.: 136,539

[22] Filed: Dec. 22, 1987

Related U.S. Application Data

[63] Continuation of Ser. No. 754,537, Jul. 12, 1985, abandoned.

[30] Foreign Application Priority Data

Apr. 12, 1985 [IT] Italy ............................... 20313 A/85

[51] Int. Cl.$^4$ ............................................. B01D 13/00
[52] U.S. Cl. ..................................... 210/638; 210/648
[58] Field of Search ....................... 210/638, 634, 648; 423/112

[56] References Cited

U.S. PATENT DOCUMENTS

| | | | |
|---|---|---|---|
| 3,957,504 | 5/1976 | Ho et al. | 210/638 X |
| 4,051,230 | 9/1977 | Mlyauchi | 210/648 X |
| 4,372,922 | 2/1983 | Possi et al. | 423/112 |

Primary Examiner—Frank Spear
Attorney, Agent, or Firm—Hedman, Gibson, Costigan & Hoare

[57] ABSTRACT

The invention relates to the separation of indium from acidic solutions containing it, by means of the formation of complex compounds with complexing substances supported on either planar or tubular membranes, of ploymeric character, and of the de-complexing of the same, followed by a re-extraction or stripping with acidic solutions, which may be either of the same type of, or different from the starting solutions.

19 Claims, No Drawings

PROCESS FOR THE SEPARATION OF INDIUM FROM ANIDIC SOLUTIONS CONTAINING IT

This is a continuation of Ser. No. 754,537, filed 7/14/85, now abandoned.

The present invention relates to a process for the separation of indium from acidic solutions which contain it. In particular, the present invention relates to a process for the separation of indium from other metals selected among Cu and/or Zn and/or Cd and/or $Fe^{+++}$ and/or Ni and/or As and/or Sb and/or Co and/or Al.

In the presently known art many systems are described for the separation of indium from acidic solutions which contain it. Some authors [see: Analytical Chemistry 39 (6) (1967) 595] illustrate the behaviour of strongly acidic quaternary-ammonium resins in sulphuric acid; others [see: Analytical Chemistry 40 (10) (1968) 1502] describe the use of weakly basic anionic condensation resins of the phenolic type in hydrochloric solution.

The above systems are useful to analytical purposes only, even if they gave, in some cases, indications which might be proposed on an industrial scale.

More recently, and with the development of the organophosphoric solvents, the problems related to the selective separation of indium from diluted solutions, have been faced also on a pilot scale, also in view of a progressive reduction of production costs.

From a study on indium halogenides [Rec. Trav. Chim. 75 (1956) 743] it has been possible to establish that the most active solvents were those which displayed high dipolar moment, and a still higher dielectric constant, together with a low solubility in water, as well as tendency to form hydrogen bonds, with the possibility of chelation.

A satisfactory separation of indium from tin was obtained by means of tributylphosphate (TBP) in n-octane. The extraction optimum conditions were accomplised in 0.1-2 M hydrochloric acid, and with a two-step process it was possible to obtain very pure indium [Proc. Int. Sol vent Extraction Conf. vol. 1 (1971) 603].

The extraction of metals from sulphuric solutions by means of the use of dialkylphosphoric acid has already been demonstrated; in particular, solutions of (2-ethylhexyl)-phosphoric acid (D2EHPA) in kerosene have been applied for the separation of indium.

Many other studies finally exist, relating to the separation of indium by means of other liquid-liquid extraction systems. Unfortunately however, all known liquid-liquid extraction systems suffer from the drawback that the solutions containing indium with large amounts of solvents have to be treated in very large equipment, and this is of course disadvantageous from the viewpoint of an industrial application both for the equipment fixed costs and for the costs necessary to circulate the great masses involved.

It has been surprisingly found that it is possible to overcome the drawbacks of the known technique by resorting, for the separation of indium contained in acidic solutions, to liquid membranes.

The object of the present invention is a process for the separation of indium contained within acidic solutions, in particular within sulphuric or hydrochloric solutions, which is characterized by the following operations:

(a) contacting of the indium-containing acidic solution with a liquid membrane containing one or more active components capable of complexing indium;

(b) complexation of the active components of the liquid membrane with indium;

(c) decomplexation of the complexes with indium by contacting the surface of liquid membrane with a regenerating (stripping) acidic aqueous solution.

The liquid membrane is preferably supported on a porous support, preferably of polymeric nature, in particular of polypropylene character and is in particular accomplished inside the porous support by means of the impregnation of the same with a solution in an organic phase, preferably selected among benzene and kerosene and the like, of one or more active components capable of complexing indium (indium extractant), it being also possible to use the active components alone (i.e., without solvent) for the purpose of impregnating the microporous support.

Such a liquid membrane is preferably interposed between the supply solution and the regeneration (stripping) solution, so that the ions present in the supply migrate to the receiving solution through the liquid film. The mechanisms of ion transportation are many, but the most advantageous one is the so-called combined transportation, wherein the metal ion contained in the supply reacts with the extractant on the membrane surface, forming a complex which diffuses to the opposite face, where the complexation reaction is inverted, due to the different concentrations of the reactants.

The pushing force of the whole process when the membrane is interposed between the supply solution and the stripping solution, is essentially the pH difference between the stripping solution (more acid) and the supply solution (less acid). This allows the metal ions to be transported also from less diluted solutions to more concentrated solution of the ion. In some cases, this transport mechanism is favoured by reactions favouring the reversibility of the reaction (i.e., reactions of metal ion complexation in the bulk of the stripping solution).

The microporous polymeric membranes (porous supports) may be of any shape, but they are preferably planar or tubular, and can be assembled as different modules. As the tubular membranes have a surface/occupied-volume ratio of a greater order of magnitude than the planar ones, they are the most interesting ones from the application viewpoint.

As for the active component of the indium-complexing liquid membrane, and used as the extractant for it, it is in particular di-2-ethylhexylphosphoric acid (D2EHPA), either alone or dissolved in kerosene in an amount of up to less than 1% by weight.

As for the microporous support, it has pores with size of from 5 $\mu$m to 0.01 $\mu$m, preferably of 0.1 $\mu$m.

As for the temperature at which the separation step may be carried out, it is generally comprised within the range of from 5° to 70° C., although the temperature is only limited by the type of the extractant (complexing agent), and by the type of support used.

Higher or lower temperatures may be used, if the conditions so allow.

The indium-containing acidic solutions are in particular copper-containing solutions, zinc-containing solutions, solutions deriving from the attack of the residues from metallurgies of zinc, lead and copper, containing indium, in the presence of Zn, Cu, Fe, As and other typical elements of the said metallurgies.

The indium-containing acidic solutions are, as said, in particular sulphuric or hydrochloric solutions, and in the case of sulphuric solutions, the acid content may range from 0.5 to 300 g/l.

For the regeneration (stripping), as said, acidic solutions are used, containing the same acid or a different acid as the acid of the supply solution. In the case of hydrochloric acid solutions, said acid may have a concentration of up to 6 N. Sulphuric acid containing solutions may contain up to 300 g/l of it.

Hydrochloric acid solutions acid may also contain chlorides, in particular sodium chloride, up to saturation.

The following examples are provided to illustrate the invention, and it will be understood that the invention is not in any way limited thereby.

EXAMPLE 1

In/Cu separation

The optimization of the composition of the stripping solutions is reported for a supply solution containing:

| | |
|---|---|
| Cu | 60 g/l |
| In | 0.5 g/l |
| $H_2SO_4$ | 30 g/l | with the use of a planar membrane ACCUREL of ENKA, activated by impregnation with a 20% solution of $D_2EHPA$ in Escaid 100. It is clear that the optimization is achieved with a 3 N HCl solution and also in the presence of an excess of In (40 and respectively 80 times), due to a recycle of the stripping solution.

| Stripping solution | HCl 0.5N | HCl 1N | HCl 2N | HCl 3N | NaCl 4.5N | HCl 0.5N NaCl 4.5N | HCl 3N In 20 g/l | HCl 0.5N NaCl 4.5N In 20 g/l | HCl 0.5N NaCl 4.5N In 40 g/l |
|---|---|---|---|---|---|---|---|---|---|
| Average flow as $\mu g/m^2 \times$ hour | 10 | 15 | 50 | 150 | 0 | 100 | 160 | 100 | 100 |

EXAMPLE 2

In/Cu separation

The optimization of extractant concentrations on a planar membrane of the same type as used in Example 1 is reported for a supply solution having the same composition as in Example 1, and for two stripping solutions of different compositions, It is clear that the optimum is obtained for concentrations of the extractant (D2EHPA) of 100%, and moreover, it is observed by comparing the data shown in the Tables of Examples 1 and 2 that the results also are independent from the In concentration in the stripping solution (40 and respectively 80 times).

| Stripping solution | 3NHCl | | | | 0.5N HCl—4.5NNaCl | | | |
|---|---|---|---|---|---|---|---|---|
| $D_2EHPA$, % | 10 | 20 | 40 | 100 | 10 | 20 | 40 | 100 |
| Average flow as $\mu g/cm^2 \times$ hour | = | 150 | 160 | 200 | 65 | 100 | 170 | 195 |

EXAMPLE 3

In separation from Cu, Zn, $Fe^{3+}$, As

A supply solution containing a plurality of ions at different concentrations has been taken into consideration:

| | | | |
|---|---|---|---|
| Cu | 60 g/l | $Fe^{3+}$ | 2 g/l |
| In | 0.5 g/l | As | 8 g/l |
| Zn | 2 g/l | $H_2SO_4$ | 30 g/l |

The test has been carried out on a planar membrane with 20% $D_2EHPA$ in Escaid 100 as the extractant. Two stripping solutions of composition equal to those of Example 2 have been tested. The optimization is obtained with a stripping solution constituted by a 3 N HCl solution.

| | Average flow, as $\mu g/cm^2 \times h$ | Concentration of stripping soln. g/l | | | | |
|---|---|---|---|---|---|---|
| | | Cu | In | Fe | As | Zn |
| Stripping solution 3NHCl | 180 | 0.03 | 0.5 | 0.05 | 0.01 | 0.06 |
| Stripping solution 4.5NNaCl 0.5NHCl | 100 | 0.3 | 0.45 | 0.03 | 0.07 | 0.006 |

EXAMPLE 4

In/Cu separation

The separation has been carried out with a solution equal to that of Examples 1 and 2, and with recycle of the same, on a tubular membrane with D2EHPA extractant at 20% in Escaid 100, as the stripping solution a 0.5 N HCl +4.5 N NaCl solution being used.

The flow rates range from 10 to 70 l/h.

| Flow rate, l/h | 10 | 30 | 70 |
|---|---|---|---|
| Average flow, as $\mu g/cm^2 \times h$ | 130 | 135 | 160 |

EXAMPLE 5

Separation of In from Cu, Zn, $Fe^{3+}$, As

Supply solution equal to that of Example 3, tubular membrane with 20% $D_2EHPA$ in Escaid 100 extractant.

Flow rate 40 l/h.

Stripping solutions 3 N HCl, and 0.5 N HCl +4.5 N NaCl.

| | Average flow as $\mu g/cm^2 \times h$ | Concentration of stripping soln. g/l | | | | |
|---|---|---|---|---|---|---|
| | | Cu | In | Fe | As | Zn |
| Stripping | 125 | 0.15 | 0.5 | 0.03 | 0.02 | 0.02 |

-continued

| | Average flow as | Concentration of stripping soln. g/l | | | | |
|---|---|---|---|---|---|---|
| | μg/cm² × h | Cu | In | Fe | As | Zn |
| solution 3NHCl | | | | | | |
| Stripping solution 4.5NNaCl 0.5NHCl | 155 | 0.003 | 0.5 | 0.04 | 0.01 | 0.01 |

EXAMPLE 6

In/Zn separation

Supply solution:

| Zn | 90 g/l |
|---|---|
| In | 0.5 g/l |
| $H_2SO_4$ | 30 g/l |

Planar membrane, with two different concentrations of the extractant, and three different stripping solutions.

| Stripping solution | 3NHCl | | 0.5NHCl 4.5NNaCl | | 0.5NHCl 4.5NNaCl In 20 g/l | |
|---|---|---|---|---|---|---|
| % of D₂EHPA | 20 | 40 | 20 | 40 | 20 | 40 |
| Flow, as μg/cm² × hour | n.d. | 120 | 55 | 135 | 75 | n.d. | n.d. = not determined.

We claim:

1. A process for the separation of indium from acidic supply solutions containing other metals selected from copper, zinc, cadmium, iron, nickel, arsenic, antimony, cobalt, aluminum, or combinations thereof, comprising:
   (a) contacting an indium-containing acidic supply solution with a liquid membrane containing one or more active components capable of complexing indium, thereby forming complexes of said active components with indium on the surface of said liquid membrane;
   (b) contacting the surface of said liquid membrane with an aqueous stripping solution which is essentially more acidic than the supply solution, simultaneously extracting indium from the membrane surface into the stripping solution and regenerating the active components capable of complexing indium.

2. Process according to claim 1, wherein the liquid membrane is supported on a porous support.

3. Process according to claim 2, wherein the porous support is a polymeric porous support.

4. Process according to claim 3, wherein the support is of polypropylene.

5. Process according to claim 3, wherein the liquid membrane is accomplished inside the porous support by means of the impregnation of the same with a solution of one or more active components capable of complexing indium, in an organic phase.

6. Process according to claim 3, wherein the liquid membrane is accomplished inside the porous support by impregnating the same with the active components capable of complexing indium.

7. Process according to claim 5, wherein the organic phase is selected between benzene and kerosene.

8. Process according to claim 2, wherein the liquid membrane is interposed between the supply acidic solution and the regeneration (stripping) acidic solution.

9. Process according to claim 2, wherein the porous support has pores of from 5 μm to 0.01 μm in size.

10. Process according to claim 9, wherein the pores are of 0.1 μm in size.

11. Process according to claim 2, wherein the active component of the indium-complexing liquid membrane is di-2-ethythexylphosphoric acid.

12. Process according to claim 2, wherein the temperature at which the separation operation is carried out is comprised within the range of from 5° to 70° C.

13. Process according to claim 2, wherein the support is planar.

14. Process according to claim 2, wherein the support is of tubular shape.

15. Process according to claim 2, wherein the acid of regeneration solution if of the same type as, or of different type from that of the supply solution.

16. Process according to claim 1 wherein the acid of the regeneration solution is HCl at a concentration of up to 6 N.

17. Process according to claim 16, wherein the solution acidic by HCl contains alkaline chlorides up to saturation.

18. Process according to claim 17, wherein the alkaline chloride is sodium chloride.

19. Process according to claim 1, wherein the acid of regeneration solution is a $H_2SO_4$ solution containing up to 300 g/l of $H_2SO_4$.

* * * * *